SELF-EXTINGUISHING DIAL LIGHT FOR TV TUNER

Filed July 24, 1953

3-3

CHARLES E. PFUND
*INVENTOR.*

*BY*

Killman and Kerst
ATTORNEYS 2,746,029

SELF-EXTINGUISHING DIAL LIGHT FOR TV TUNER

Charles E. Pfund, Timonium, Md., assignor to Bendix Aviation Corporation, Towson, Md., a corporation of Delaware Application July 24, 1953, Serial No. 370,136

3 Claims. (Cl. 340—282)

This invention relates to dial lights and more particularly to self extinguishing dial lights for television applications.

The average person desires a semi-darkened room when viewing television. Under these conditions, it is difficult to distinguish the numerals on the channel selector dial when turning to a new channel unless some auxiliary means of illumination is provided or the room lights are lighted. Any form of panel lighting that would be constant and exposed to the viewer would be distracting and annoying to him and therefore undesirable. To provide a cover or a manually controlled switch for a dial light would be inconvenient to the person selecting the program.

It is an object of this invention to provide on the dial of a turret type channel selector of a television set an illuminating means that will become energized when selecting a new channel and then will shortly thereafter extinguish itself.

This and other objects and advantages of the invention are realized by an arrangement in which a detent cam, mounted on the same shaft that is employed for channel selecting, moves a detent follower, when changing from one channel to another, such that a circuit is momentarily closed. The closing of this circuit charges a capacitor and ionizes a neon lamp. When the circuit is opened, the lamp remains lighted until the capacitor has discharged to a certain level. A resistor is provided to limit the current flowing through the lamp and to provide a delay in the discharging of the capacitor such that the lamp will remain lighted for a short length of time after the circuit has been opened.

Referring to the drawings.

Figure 1:
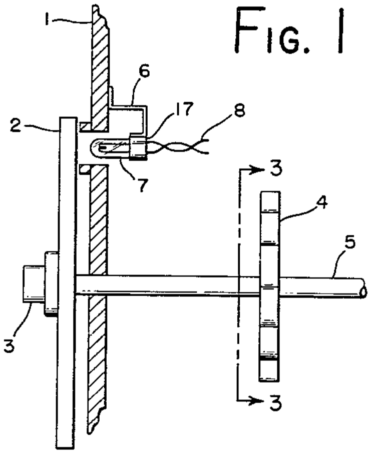
Fig. 1 is an elevational view of a portion of a dial lighting system embodying the invention.

Considering Fig. 1 it is seen that it shows the control panel 1 of a television set through which projects a shaft 5, which on one end supports the dial 2 and a knob 3 for the manual rotation thereof, and on the opposite end, the detent can 4. The lamp 7, mounted in a socket 17, secured to a bracket 6, projects through an opening in the panel 1, and illuminates a portion of the dial 2. Wire leads 8 extend from the socket 17 and are connected into an energizing circuit shown in Fig. 4.

Figure 2:
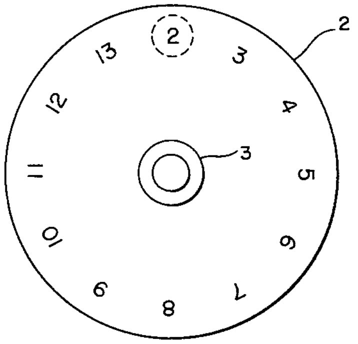
Fig. 2 is a front view illustrating the dial and an illuminated area around the selected channel numeral of the system of Fig. 1.

Fig. 2 is a front view of the dial 2 and the knob 3. The dial 2 is made from a translucent material having formed therein or thereon numerals corresponding to the television channels.

Figure 3:
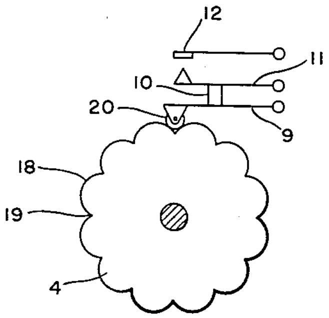
Fig. 3 is a sectional view showing the detent cam and the cam follower mechanism of the system.

Fig. 3 is a sectional view showing the detent cam 4, the detent follower 9, a roller 20, an insulator spacer 10, a switch blade 11, and a contact 12. The detent cam 4 consists of a disc with the same number of lobes 18 as channel positions and aligned such that the roller 20 is in one of the notches 19, when the dial 2 is on a channel position. The spacer 10 is so positioned between the detent follower 9 and the switch blade 11 that when the detent cam 4 is revolved to select another channel, the switch 11 and the contact 12 are momentarily closed when the roller 20 passes over a lobe 18.

Figure 4:
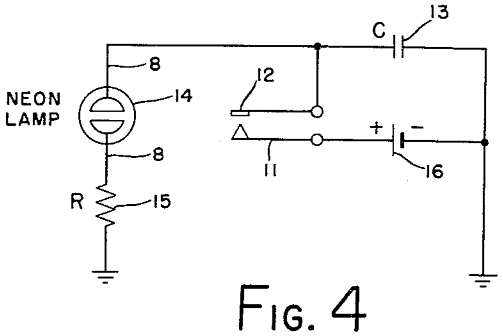
Fig. 4 is a schematic diagram of the energizing circuit of the system of Fig. 1.

Fig. 4 is a schematic diagram of the energizing circuit for the lamp 14, comprising: a battery 16, the negative polarity terminal being grounded and the positive polarity terminal being connected to the switch blade 11, the contact 12 with which the switch blade connects, the capacitor 13 which connects between the contact 12 and ground, the neon lamp 14 and the resistor 15 connected in series and between the junction of the contact 12 and the capacitor 13 and ground.

The functioning of the circuit is such that when the switch blade 11 closes with the contact 12, a current flows and the battery 16 charges the capacitor 13 to a voltage level determined by the lattery 16. The lamp 14 will ionize when the value of voltage on the capacitor 13 reaches the ionization potential thereof and will remain ionized until the potential across the lamp 14 falls to its deionizing potential. The resistor 15 is to limit the current flow through the lamp 14 when switch blade 11 and contact 12 are closed and to limit the rate of discharge of the capacitor 13 subsequent to the opening of the switch blade 11 and the contact 12. The lamp 14 will be deionized when the capacitor 13 potential minus the potential drop across the resistor 15 equals the deionizing potential of the lamp 14.

Figure 5:
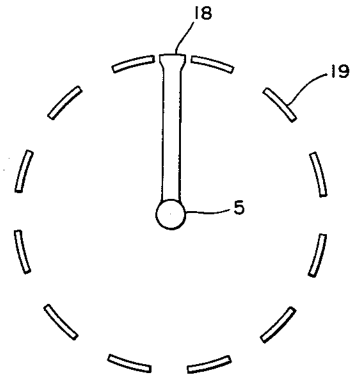
Fig. 5 is a sectional view showing an alternate means of accomplishing the switching action performed by the cam and the cam follower in Fig. 3.

Fig. 5 is a sectional view showing a wiper 18 and contacts 19 as an alternate means of accomplishing the switching action of the detent cam, cam follower, roller, spacer, switch blade and contact of Fig. 3. This switching means comprises a wiper arm 18 mounted on the shaft 5 for rotation therewith, and a number of contacts 19 equal to the number of channel positions. The wiper 18 and the contacts 19 are so constructed and adjusted that the wiper 18 is between contacts 19 when the dial 2 is on the channel positions, and makes momentary connection with a contact 19 when switching from one channel to the other. All contacts 19 are electrically interconnected.

Although a preferred embodiment of the invention has been illustrated and described, it will be understood that various changes and modifications may be made without departing from the intended scope of the invention.

What is claimed is:

1. A system for the temporary illumination of the channel selecting dial of a television receiver; said system comprising, a lamp positioned to illuminate the indication of said dial which identifies the channel selected thereby, said lamp being normally extinguished, and means for energizing said lamp when said dial is rotated for the selection of a new channel, said means comprising, an energizing circuit for said lamp, an energy source in said circuit, a switch in said circuit, a cam actuated by the rotation of said dial, a cam follower actuated by said cam, said cam follower being positioned to operate said switch, and being so positioned that said switch is normally in its open position, thus interrupting said circuit, means actuated by the rotation of said dial to close said switch only during the rotation of said dial between positions corresponding to the selection of television channels, and an energy storage means in said circuit, said storage means being charged on the closing of said switch and discharging through said lamp upon the opening of said switch.

2. A system for the temporary illumination of the channel selecting dial of a television receiver; said system comprising, a lamp positioned to illuminate the indication of said dial which identifies the channel selected thereby, said lamp being normally extinguished, and means for energizing said lamp when said dial is rotated for the selection of a new channel, said means comprising, an energizing circuit for said lamp, an energy source in said circuit, a switch mechanism in said circuit, said switch mechanism comprising a cam follower and a pair of contacts actuated thereby, a cam actuated by the rotation of said dial, said cam constructed and positioned as to so actuate said switch mechanism that said switch mechanism is normally in its open position, thus interrupting said circuit, means actuated by the rotation of said dial to close said switch only during the rotation of said dial between positions corresponding to the selection of television channels, and an energy storage means in said circuit, said storage means being charged on the closing of said switch and discharging through said lamp upon the opening of said switch.

3. A system for the temporary illumination of the channel selecting dial of a television receiver; said system comprising, a lamp positioned to illuminate the indication of said dial which identifies the channel selected thereby, said lamp being normally extinguished, and means for energizing said lamp when said dial is rotated for the selection of a new channel, said means comprising, an energizing circuit for said lamp, an energy source in said circuit, a switch in said circuit, a cam actuated by the rotation of said dial, the periphery of said cam being formed of a plurality of lobes, said lobes being equal in number to channel positions, a cam follower actuating said switch, said cam follower, cam and switch being so constructed and adjusted that said switch is closed at all times except when said cam follower is at lowest points of the periphery of said cam, said lowest points being so located relative to said follower that a respective one of said points lies beneath said follower as the selection of each channel is accomplished by said dial, and an energy storage means in said circuit, said storage means being charged on the closing of said switch and discharging through said lamp upon the opening of said switch.

References Cited in the file of this patent

UNITED STATES PATENTS

| | | |
|---|---|---|
| 667,859 | Wood | Feb. 12, 1901 |
| 1,350,587 | Baker | Aug. 24, 1920 |
| 2,251,794 | Holst | Aug. 5, 1941 |
| 2,462,655 | McHenry | Feb. 22, 1949 |
| 2,606,239 | Beste | Aug. 5, 1952 |